United States Patent [19]
Verner

[11] 3,879,596
[45] Apr. 22, 1975

[54] METHOD FOR ELECTRICAL DISCHARGE MACHINING EMPLOYING PERIODIC EXTENDED PULSE OFF TIME

[75] Inventor: Dalton R. Verner, Orchard Lake, Mich.

[73] Assignee: Colt Industries Operating Corporation, New York, N.Y.

[22] Filed: July 19, 1973

[21] Appl. No.: 380,757

Related U.S. Application Data

[62] Division of Ser. No. 228,661, Feb. 23, 1972, Pat. No. 3,789,182.

[52] U.S. Cl.............................. 219/69 M; 219/69 P
[51] Int. Cl............................................. B23p 1/08
[58] Field of Search............... 219/69 M, 69 P, 69 C

[56] References Cited
UNITED STATES PATENTS

| | | |
|---|---|---|
| 3,439,145 | 4/1969 | Sennowitz .......................... 219/69 P |
| 3,485,988 | 12/1969 | Sennowitz .......................... 219/69 P |
| 3,558,842 | 1/1971 | Lirshits............................... 219/69 P |
| 3,614,368 | 10/1971 | Lobur................................. 219/69 P |
| 3,697,719 | 10/1972 | Verner et al........................ 219/69 C |

*Primary Examiner*—Bruce A. Reynolds
*Attorney, Agent, or Firm*—Hauke, Gifford, Patalidis & Dumont

[57] ABSTRACT

Electrical discharge machining is provided by generating a series of rectangular machining power pulses at a controllable on-off time duration. Provision is made for introducing extended off time duration between groups of pulses to contribute to the improvement of cutting stability. In an alternate embodiment of the invention, a single on time pulse is provided intermediate a pair of spaced pulse groups.

4 Claims, 8 Drawing Figures

METHOD FOR ELECTRICAL DISCHARGE MACHINING EMPLOYING PERIODIC EXTENDED PULSE OFF TIME

REFERENCE TO RELATED APPLICATION

The present application is a division of my U.S. application, Ser. No. 228,661, filed on Feb. 23, 1972, for "Method and Apparatus for Electrical Discharge Machining Employing Periodic Extended Pulse Off Time", now issued as U.S. Pat. No. 3,789,182 patent which is of common ownership herewith.

BACKGROUND OF THE INVENTION

The field to which this invention relates is that known as electrical discharge machining, hereinafter sometimes referred to as EDM, in which material is removed from an electrically conductive workpiece by the action of electrical gap discharges passed between a tool electrode and the workpiece. A servo feed system is normally used to provide relative movement to maintain an optimum gap spacing between the electrode and workpiece as the work-piece material is progressively removed. A dielectric liquid coolant is circulated and recirculated under pressure through the gap during machining operation. In order to provide machining with reliable and predictable results, an electrical discharge machining circuit of the independent pulse generator type is preferably used to provide machining power pulses of precisely controllable frequency and on-off time. In this particular type of EDM circuit, the pulse generator may be embodied as a multivibrator, square wave oscillator or the like. Under adverse cutting conditions, such as when poor coolant flow condition is present or when the proper coolant flow pattern is particularly difficult to establish by reason of the particular geometry of the electrode and the work-piece, it becomes difficult to maintain stable EDM cutting. Similar problems are met with certain types of workpiece metals now being used for the production of dies, such as, for example, cast iron as it is now used in large size die production.

BRIEF STATEMENT OF THE INVENTION

It has been found advantageous when the above described conditions are encountered to provide a control for the pulse generator itself such that the machining power pulses are periodically interrupted by extending the normal pulse off time, preferably for a time duration at least equal to at least two times the normal pulse off time duration. It appears that machining with the resultant spaced trains of power pulses has the effect of permitting gap recovery, thus substantially contributing to and improving the stability of cutting. Further, with respect to cast iron cutting, this mode of cutting has the effect of eliminating the undesirable molten pool and spatter effect which sometimes occurs on the workpiece surface.

BRIEF DESCRIPTION OF THE DRAWINGS

Reference is made to the appended specification which explains the present invention and to the drawings in which like numerals and letters are used to refer to like elements which are shown throughout the several drawings and wherein.

DESCRIPTION OF THE PREFERRED EMBODIMENTS

Figure 1:
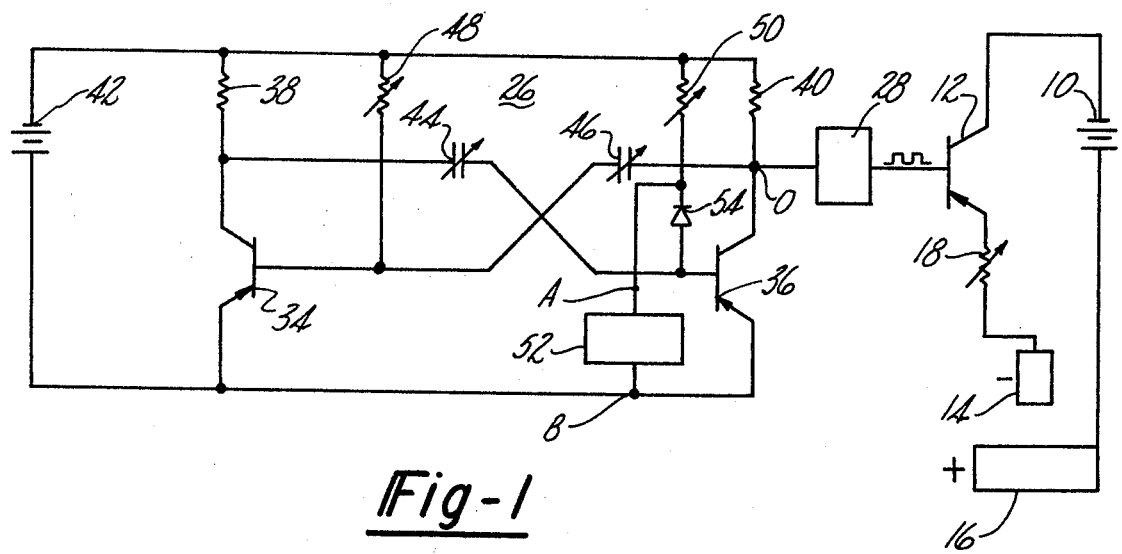
FIG. 1 is a combined schematic and block diagrammatic representation of an electrical discharge machining power supply incorporating the present invention.

Referring now to FIG. 1, the main machining power DC source 10 is shown connected in series with the power conducting or principal electrodes of an output transistor 12 and in series with the machining gap, which gap includes a tool electrode 14 and a workpiece 16. It will be understood that a plurality of output transistors 12 may be connected in parallel to provide the required magnitude of cutting current. The gap current level is selectively controlled by the magnitude of a variable series resistor 18. The electrical discharge machining power supply further includes a pulse generator embodied as a multivibrator stage 26 and one or more intermediate drive stages 28 which are used to turn the output stage transistor 12 on and off with precisely controllable pulse duty factor and frequency. In the interest of brevity, the driver stage 28 has been illustrated in a block diagrammatic form.

The multivibrator 26 includes a pair of transistors 34 and 36 which are biased and coupled for alternate switching operation in the astable multivibrator mode. The transistors 34, 36 are each connected through a corresponding load resistor 38, 40 to the negative terminal of a DC source 42. A pair of banks of cross-coupling capacitors 44 and 46 are connected to the transistors 34, 36, respectively. The switching capacitor elements have been shown as adjustable capacitors in the interest of simplification. It will be seen that the collectors of the transistors 34, 36 are each cross-coupled to the opposing transistor base for the purpose of controlling the multivibrator 26 output pulse frequency and, accordingly, controlling the frequency of the machining power pulses provided to the machining gap. A pair of adjustable resistors 48 and 50 are included in the multivibrator 26 circuit, with the machining pulse on-off time controlled by the relative setting of those resistors.

Figure 2:
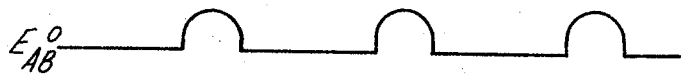
FIGS. 2 and 3 represent diagrams of two control voltage waveforms which are typical outputs of a second pulse generator which may be used in practicing the present invention.
Figure 3:

Also included in FIG. 1 is a second pulse generator 52 which is shown in block form as it is connected in the circuit across the terminals A and B. A diode 54 is included in series between the terminal A and the base of the "off time" control transistor 36. The output signal across the terminals A and B is shown in FIGS. 2 and 3. The output may be of either voltage waveform illustrated in accordance with the particular type of pulse generator 52 used.

Figure 4:
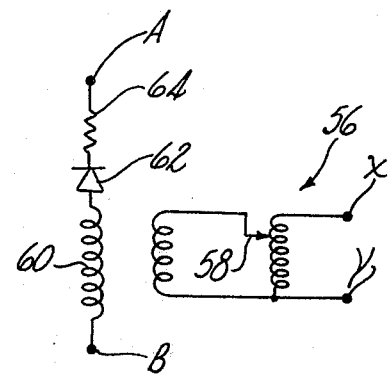
FIG. 4 is a schematic drawing of one embodiment of the second pulse generator to be employed.

FIG. 4 shows one embodiment of the second pulse generator 52 which may be used in conjunction with the multivibrator 26. It will be seen to include a variac 56 which is connected to a line voltage source across a pair of terminals X and Y, with the magnitude of the voltage output controlled by a slider 58. The voltage pulse output is connected inductively to a winding 60, passes through a diode 62, a limiting resistor 64, and finally to the output terminal A. It will be understood that the second pulse generator alternately may be a multivibrator similar to the multivibrator 26 but operated at different but appropriate on-off time and frequency.

Figure 5A:
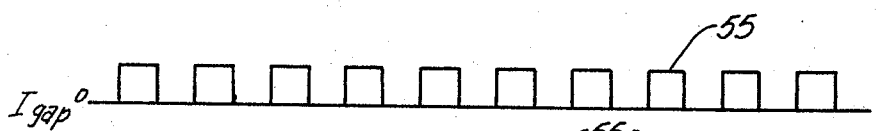
FIGS. 5a and 5b are gap current diagrams showing the normal electrical discharge machining pulse waveform and the pulse waveform available from the several embodiments of the invention.
Figure 5B:
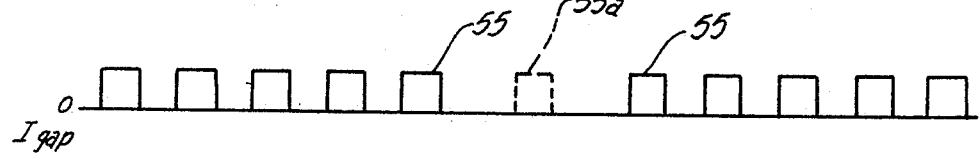
Figure 6:
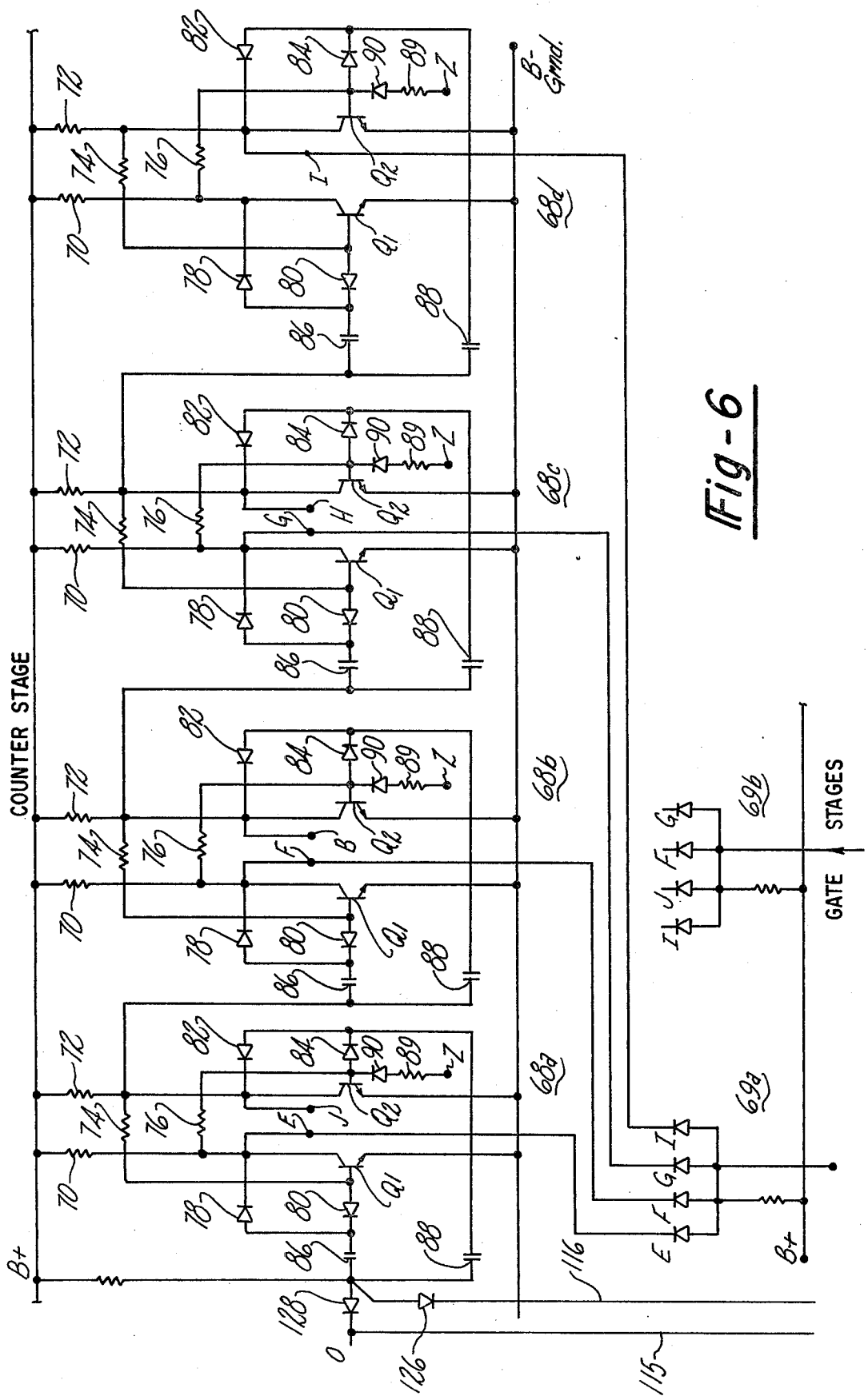
FIGS. 6 and 7 are schematic diagrams showing an additional embodiment of the present invention in which an electronic counter and control circuit are included.

FIG. 6 shows the counter and gating stages used in the alternate embodiment for the present invention. It has been found that the best machining results are obtained when the machining power pulses are separated for a time duration equal to at least two normal off time durations. This condition is illustrated in FIG. 5b as compared to FIG. 5a and in each case the normal machining power pulses are identified by the numeral 55. As shown in FIG. 5b, there is a spacing provided of at least two normal off time durations between the last pulse 55 of a machining pulse group and the first pulse 55 of the next following group. As one improvement to the machining method, I have found it is oftentimes advantageous to include between the two successive groups of pulses a single machining power pulse such as indicated in dash line form and identified by the numeral 55a. This intervening pulse appears to have the advantage of keeping sufficient power in the gap between pulse trains to maintain a normal downfeed for the servo system. It further appears to facilitate restriking by the first pulse of the next following pulse train. It will be noted that the pulse 55a is of the same duration as a normal pulse 55.

In order to provide the method of EDM just described and illustrated in FIG. 5b, there is provided a control circuit including a counter stage of four flip-flops 68a, 68b, 68c and 68d together with a plurality of diode input gates, two of which are shown at 69a and 69b. The left-hand gate 69a is designed to provide eight pulses in each machining pulse train, while the right-hand gate 69b provides a nine pulse train. For different work-piece-electrode material combinations and for different cutting conditions, it is advantageous to have the capability of changing the number of pulses in each pulse train. Additional gating stages may be included in the circuit to give this flexibility.

Now, with more particular reference to the several counter flip-flop stages 68a through 68d, it will be seen that each contains a flip-flop with a pair of alternately operable transistors $Q_1$ and $Q_2$. The flip-flops are symmetrically designed and include like value collector resistors 70 and 72, and like value bias resistors 74 and 76. The input to the counter stages is provided at the left-hand terminal 0 from the multivibrator 26 as previously shown in FIG. 1. Each flip-flop further includes a pair of signal diodes 78 and 80 connected to the collector and base of each transistor $Q_1$ and a pair of signal diodes 82 and 84 connected to the collector and base respectively of each transistor $Q_2$. Coupling capacitors 86 and 88 are connected to each counter as indicated.

Each counter flip-flop stage further includes provision for a reset pulse after the counting period is ended. In each case, the reset pulse is provided at a terminal Z and passed through a series resistor 88 and a diode 90 to the base of each transistor $Q_2$ of each counter flip-flop stage for reset. The manner and the sequence in which the reset pulse is generated will be explained and shown in connection with FIG. 7 hereinafter.

Figure 7:
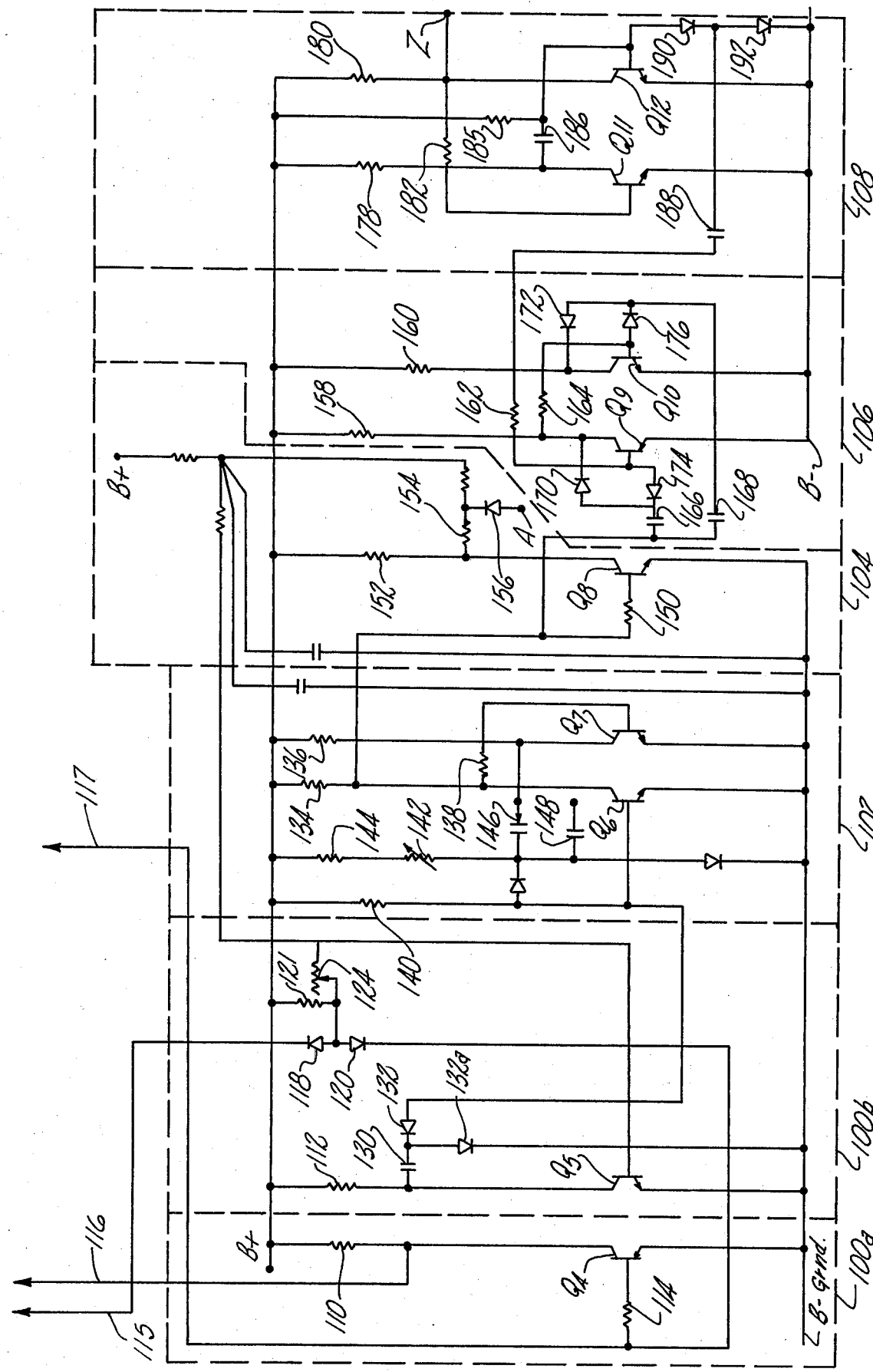

The circuit of FIG. 7 includes the control network which serves to coordinate the operation of the multivibrator 26 with that of the gating and counter stages. It provides suitable control outputs to turn off and turn on the multivibrator 26 at the right times. Finally, after the counting operation is completed, it provides for a reset of each of the flip-flop counter stages 68a, 68b, 68c and 68d. Included in the circuit of FIG. 7 are an inverter stage 100a, a power amplifier stage 100b, a monostable stage 102, a transistor turn off stage 104, a flip-flop stage 106 and a final monostable stage 108. For clarification, the several stages 100a, 100b, 102, 104, 106 and 108 are enclosed by dash line boxes.

With more particular reference to the inverter stage 100a, it will be seen to include a transistor $Q_4$. A suitable series load resistor 110 is connected between a B+ voltage source and the collector of the transistor $Q_4$. A signal limiting resistor 114 is connected in series with the base of the transistor $Q_4$. The connections between the circuit of FIGS. 6 and 7 are indicated by the three leads 115, 116 and 117. Included in series with the input from the multivibrator 26 at the lead 115 is a diode 118. Diode 120 is operatively connected as shown in series with lead 117. A variable resistance comprising a fixed resistor 121 and a potentiometer 124 is connected between the junction of the diodes 118 and 120 and the base of the transistor $Q_5$. Upon occurrence of the first multivibrator pulse after an output on lead 117, a signal is provided through a diode 132 which triggers monostable stage 102. At the same time, a signal is provided from the lead 117 to the base of the inverter transistor $Q_4$ to turn it on. This provides a grounding signal to the counter to stop and hold the existing count through the lead 116.

The monostable stage 102 includes a transistor $Q_6$ and a transistor $Q_7$. A pair of collector load resistors 134 and 136 are connected in the manner shown with biasing resistors 138 and 140 connected in the circuit. A time constant of operation is selectively controllable through the adjustment of a variable resistor 142, which is series connected between the B+ source and a fixed resistor 144 and through the selection of one of a plurality of capacitors 146 and 148 which may conform in number with the plurality of tapped capacitor switches 44, 46 used to control the on-off time of the multivibrator 26. It will be understood that the transistor $Q_6$ of the monostable stage 102 is biased normally on. Upon receipt of a keying signal from the amplifier stage 100b, the transistor $Q_6$ will be turned off and provide a signal to the multivibrator turn off stage 104.

The stage 104 will be seen to include a transistor $Q_8$ having its base connected through a signal resistor 150 to the collector of the monostable transistor $Q_6$. The transistor $Q_8$ further has its collector connected to the B+ source through a series resistor 152. The signal output from the transistor $Q_8$ is provided through a resistor 154 connected in series with a diode 156 to the terminal A of the multivibrator 26 in the FIG. 1 drawing. A pulse output from the transistor $Q_8$ is thus effective to turn off the transistor 34 of the multivibrator 26. At the same time, a triggering pulse is provided from the monostable stage 102 to the flip-flop stage 106, more particularly to the base of transistor $Q_9$. The other operating elements of the flip-flop stage 106 include a transistor $Q_{10}$, a pair of like-value load resistors 158 and 160 connected in series respectively with the collectors of the transistors $Q_9$ and $Q_{10}$, and a pair of biasing resistors 162 and 164 which are connected to the respective bases of the transistors $Q_9$ and $Q_{10}$. The pulse input to the flip-flop stage 106 is provided through the coupling capacitors 166 and 168 with signal diodes 170, 172 and 174, 176 connected in series with the respective collectors and bases of the transistors $Q_9$ and $Q_{10}$. When the monostable transistor $Q_6$ returns to its "on" stage, it permits restart of the multivibrator 26. In the conducting state of the transistor $Q_6$, the multivibrator 26 is again permitted to operate. When multivibrator 26 starts to operate, one pulse retriggers the monostable stage 102. The monostable stage 102 then reblocks the multivibrator 26 through the previously described path. At the end of the second time constant of operation of the monostable stage 102, the flip-flop 104 is reset to its original state. By this action, the monostage stage 108 is triggered.

The monostable stage 108 includes a pair of transistors $Q_{11}$ and $Q_{12}$ having a pair of series load resistors 178 and 180 connected in series with their respective collectors. A pair of bias resistors 182 and 184 are also connected in circuit as shown. Capacitor 186 is connected between the lower end of the resistor 184 and the collector of the transistor $Q_{11}$. It will be seen that the signal output from the flip-flop stage 106 passes through a coupling capacitor 188 and a diode 190 to trigger the monostable stage 108. A separate diode 192 is connected in series with a B—voltage as indicated. Responsive to its retriggering, the monostable stage 108 resets the counter stages 68a–68d through lead Z. Upon reset of the counter, the circuit is placed in readiness for another group of pulses to be generated through the system. The cycle then is repeated in the manner described above.

DESCRIPTION OF OPERATION

In the circuit of FIG. 1, the multivibrator 26 provides a pulse output which is suitably amplified and resquared in the intermediate drive stage 28 to render the output transistor 12 alternatively conductive and nonconductive and therefore to provide a continuous series of machining power pulses across the machining gap as best shown in FIG. 5a. The machining pulse on time is controlled in phase with the conduction of the transistor 34, while the pulse off time is controlled in phase with the conduction of the transistor 36. It will be noted that while the present invention utilizes transistors as the electronic switches throughout the circuit, the invention is not so limited. With proper redesign of the circuit by one skilled in the art, any electronic switches may be substituted for the transistors shown. By "electronic switch" is meant any electronic control device having more than two electrodes comprising at least two power conducting or principal electrodes acting to control current flow in the power circuit, the conductivity of the power circuit being controlled by a control electrode within the device, whereby the conductivity of the power circuit is controlled statically or electrically without movement of any mechanical elements within the device itself. Included within this definition by way of example but not limitation are electron tubes, transistors, semi-conductor controlled rectifiers, thyratrons and similar electronic devices.

As has already been described, there are problems which arise during unstable cutting conditions in the gap which may in some cases lead to actual gap short circuiting with resulting damage to the electrode tool and the workpiece itself. Systems have been devised which respond to the existence of gap short circuit conditions and by one means or another either to totally interrupt power to the gap or to control the power content of the following machining power pulses. One example of such a short circuit protection system is shown in my U.S. Pat. No. 3,697,719, issued on Oct. 10, 1972, for "Pulse Narrowing and Cut-Off Protection System for Electrical Discharge Machining".

I have found that it is possible by employing the EDM method and apparatus which I have provided to avoid most gap short circuiting through control of the machining pulse waveform at the pulse generator itself, namely through control of the multivibrator 26. The problems already described with respect to machining cast iron and similar materials may be overcome by providing a periodic recovery period to permit deionization of the gap and attendant cooling effect on the gap elements. This is accomplished by using a second pulse generator or pulse source 52 and providing off time duration control with respect to the first pulse generator, exemplified by the multivibrator 26 of FIG. 1. It will be seen that in the operation of the multivibrator 26 with the on time and the off time being controlled by the conduction of the transistor 34 and by the conduction of the transistor 36, respectively, it is possible by superimposing a control pulse of the proper polarity on the off time control transistor 36 to extend the off time duration, and in this manner effectively provide machining by spaced pulse trains.

I have further found it to be particularly advantageous to provide a spacing which is equal to at least twice the normal on-off time pulse duration to permit the full gap recovery action to take effect. It should be noted that the method of EDM according to the present application is one in which the control of machining pulses is adjustably made and continuously carried out throughout the machining operation with no power interruption being made to change and substantially restore the original operating parameters. In this manner, it is possible to avoid the excessive hunting and cutting time loss which is inherent in those systems which respond to a gap short circuit and, at a later time, are returned to normal machining operation.

In the operation of the multivibrator 26, the resistor 50 is first adjusted to preset the off time, while the resistor 48 is adjusted to preset the on time. The voltage pulses from the second pulse generator 52, as they are seen across terminals A and B, are of much lower frequency than the machining power pulses as shown, for example, in the FIG. 5 waveforms. In order to provide a sufficiently long pulse interruption, the time duration of the control pulses from the second pulse generator 52 are of a duration in excess of twice the normal pulse repetition rate.

The drawing of FIG. 5b illustrates the resultant spacing between machining power pulses which occurs as a result of the operation of the second pulse generator 52. I have further found that, as a matter of convenience, symmetrical pulse generators may be used. It is alternately possible to use generators across terminals A and B which operate in a somewhat random fashion to provide a similar off time extension and thereby control the machining power pulses. The alternate embodiment as has been shown and described in relation to FIGS. 6 and 7 provides for a similar periodic extension of pulse off time with a counter included to provide for the selection of the number of pulses in each machining group. In addition, provision is made to include an adjustable width pulse between the trains of machining power pulses.

It will thus be seen that I have provided an improved method for electrical discharge machining which is novel and represents a substantial improvement with respect to cutting work-pieces of a material and of a configuration often found difficult to cut even by the EDM process.

Having thus described my invention, I claim:

1. The method of electrical discharge machining of an electrically conductive workpiece by providing machining power pulses in groups thereto across a dielectric filled gap comprising the steps of:
   a. providing a series of machining power pulses across the machining gap at predetermined on and off times;
   b. predetermining the number of pulses in machining pulse groups; and
   c. periodically extending the off time between such groups of said pulses to provide a predetermined off time which is substantially greater than the normal predetermined off times.

2. The combination as set forth in claim 1 wherein a single pulse of substantially normal on time is provided between said groups of pulses.

3. The method of electrical discharge machining of an electrically conductive workpiece by providing machining power pulses thereto across a dielectric filled gap comprising the steps of:
   a. predetermining by a counter the number of pulses to be included in machining power pulse groups;
   b. providing machining power pulses of such groups at predetermined on-off time pattern across the gap; and
   c. introducing an extended pulse off time at uniformly spaced intervals between said groups of pulses whereby the stability of machining of metals of the cast iron type is improved.

4. The method of electrical discharge machining of an electrically conductive workpiece by passing machining power pulses across a dielectric coolant filled gap comprising the steps of:
   a. generating said pulses in a train of pulses having a predetermined on-off time;
   b. predetermining the number of pulses in each such train by a counter; and
   c. periodically extending the pulse off time between such trains to interrupt machining for predetermined periods exceeding at least two times the normal pulse off time duration.

* * * * *